Jan. 3, 1961 K. H. GEIGER ET AL 2,967,107
CONTINUOUS FERMENTATION PROCESS
Filed March 4, 1957 3 Sheets-Sheet 2

INVENTORS
KENNETH H. GEIGER
JOHN COMPTON
BY Smart & Biggar
ATTORNEYS

Jan. 3, 1961 K. H. GEIGER ET AL 2,967,107
CONTINUOUS FERMENTATION PROCESS
Filed March 4, 1957 3 Sheets-Sheet 3

INVENTORS
KENNETH H. GEIGER
JOHN COMPTON
BY Smart + Biggar.
ATTORNEYS.

United States Patent Office 2,967,107
Patented Jan. 3, 1961

2,967,107
CONTINUOUS FERMENTATION PROCESS

Kenneth H. Geiger and John Compton, both of London, Ontario, Canada, assignors to John Labott Limited, London, Ontario, Canada Filed Mar. 4, 1957, Ser. No. 643,846

8 Claims. (Cl. 99—43)

The present invention relates to a novel continuous fermentation process for the production of potable beer.

The term "beer" has been more or less loosely used to designate in various industries the liquid product of a fermentation process regardless of whether the fermentation has been carried out to produce yeast, to produce an antibiotic, to produce an alcohol solution from which industrial alcohol or liquor can be worked up by distillation or whether the fermentation has been used to produce a fermented liquid which eventually finds its way to the consumer in the form of a beverage and referred to commercially, for instance, as beer, ale, lager, stout, cream porter, etc. It is to the production of this latter class of beers that the present invention is particularly directed and for convenience of reference, the said class of beers which are used as beverages are referred to herein collectively under the designation "potable beer" to distinguish them from other types of liquid fermentation product.

Continuous fermentation processes have already been utilized in connection with the production of industrial grade alcohols, and the desirability of continuous fermentation in the production of potable beer has long been recognized in the art. The principal obstacle to the adaptation of existing continuous fermentation methods to the production of potable beer has been the inability of such processes to provide adequate control of flavour. As is well recognized, the control of flavour is of paramount importance insofar as the production of potable beer is concerned.

The present invention provides a continuous fermentation process in which the control of flavour is readily achieved, and in which a number of additional advantages are to be found in addition to those important ones which might normally be expected to flow from the conversion of what has previously been a batch operation into a continuous one.

According to the present invention, potable beer is produced by the yeast fermentation of a fermentable carbohydrate which is carried out in stages. A first stage is provided in which aerobic conditions favourable to yeast growth are maintained, and a second stage is provided in which anaerobic conditions favourable to carbohydrate attenuation are maintained. Preferably according to the invention, the yeast concentration in the second stage of the process is maintained substantially constant at a concentration which is in excess of the maximum level normally obtainable or commonly used under batch fermentation conditions. This level of yeast concentration is maintained by separating at least a portion of the yeast from the effluent of the second stage and recycling it through the second stage.

Operating in this manner, the first stage of the process serves primarily as a continuous yeast propagator under predetermined aerobic conditions while the second stage which may be, and preferably is, carried out in a series of separate series connected vessels serves primarily for attenuation of the fermentable carbohydrates to alcohol under predetermined anaerobic conditions. For convenience hereinafter, we refer to the first stage of the process as the "yeast propagation stage" and the second stage as the "product formation stage."

The inherent advantages of the continuous fermentation process described above are manifold, and of substantial practical importance. For instance, the growth rate of yeast and feed rate of fermentable substrate are equilibrated and controlled under steady state conditions in the first stage, so that the extent or rate of metabolism unconnected with yeast cell growth and/or reproduction is not critical. The maintenance of any predetermined high yeast concentration in the second stage is independent of flow rate, while, provided a relatively high concentration of yeast is present in the second stage, the rate of product formation will be for all practical purposes independent of yeast growth and, provided the substrate is satisfactory, almost entirely dependent on total quantity of yeast present and temperature.

Because the process of the invention makes for more efficient substrate utilization, less is used for yeast production than in normal batch fermentations.

Furthermore, a very rapid fermentation is possible, with a holdup time appreciably less than in other conventional fermentation systems, batch or continuous, without concommitant adverse effects on the quality of the product.

In some of its applications the invention permits the use of yeast strains which, although highly desirable in certain respects, possess one or more undesirable features which, from a practical point of view preclude their use in current conventional processes. For example in conventional brewery practice a flocculating yeast cannot normally be used where it is desired to run to primary storage a fully attenuated product. A fermentation system such as is described herein will permit the use of such a flocculating yeast for such a purpose. Similarly, in some of its applications this invention permits lower fermentation temperatures the use of which, although highly desirable in certain respects, involves one or more undesirable features which from a practical point of view precludes their use in current conventional processes. For example, whilst it is known that in the production of certain malt liquors the lowering of the fermentation temperature enhances the quality of the fermentation product, the accompanying increase in fermentation time makes such a process impracticable in current conventional systems. The fermentation system of the invention will permit the use of lower fermentation temperatures without the disadvantage of a through time of economically prohibitive duration.

This invention has important applications in the production of malt liquors such as lager beers, ales, stouts and other similar fermented beverage.

An example of operation according to the process of the invention is given in the following detailed specification in which reference is had to the accompanying drawings wherein.

Figure 1:
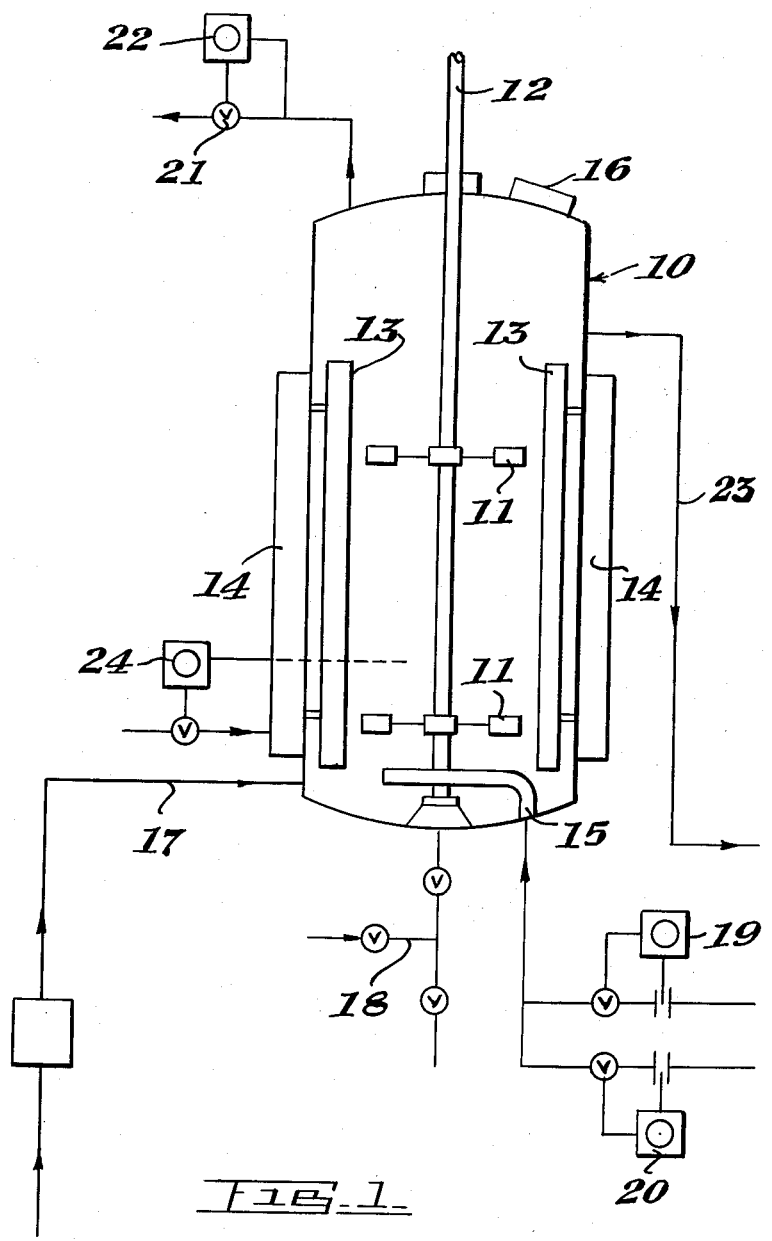
Figure 1 is a schematic illustrating a type of fermentation vessel which may be used in carrying out the process of the invention indicating typical fittings and controls.

Referring now more particularly to the drawings, the vessel 10 illustrated in Figure 1 may be of any suitable type and size and is suitably equipped with the agitators 11 mounted on rotatable shaft 12, baffles 13 and a cooling jacket 14. At the bottom of the vessel is a suitable sparger 15, while at the top is the manhole 16 providing access to the interior for cleaning and inspection.

Provision is made for supply to the vessel 10 of controlled quantities of wort through line 17. Steam line 18 is used for equipment sterilization. The sparger is suitably connected to sources of carbon dioxide and air so that either one or the other or both may be controllably supplied as desired. Preferably, the carbon dioxide line and the air line are equipped with flow controllers 19 and 20 respectively.

The vessel 10 is further equipped with a vent arrangement 21 which is provided with a pressure controller 22 to regulate the pressure within the vessel 10. Effluent from the vessel 10 flows out line 23 to the next stage of the process. Preferably, the temperature of the wort within the vessel 10 is maintained automatically, and this is suitably accomplished by supplying chilled water to the cooling jacket 14 under control of a temperature controller 24.

The components above described are conventional and will not all necessarily be required depending upon the function which the vessel is performing and the conditions which are being maintained within it. Clearly also, the functions performed by each individual component could be performed equally as well by any other apparatus known in the art and suitably for performing the desired function. For example, temperature control might be achieved by external attemperation, the pumping cycle of which would also assist or replace the agitator.

Figure 2:
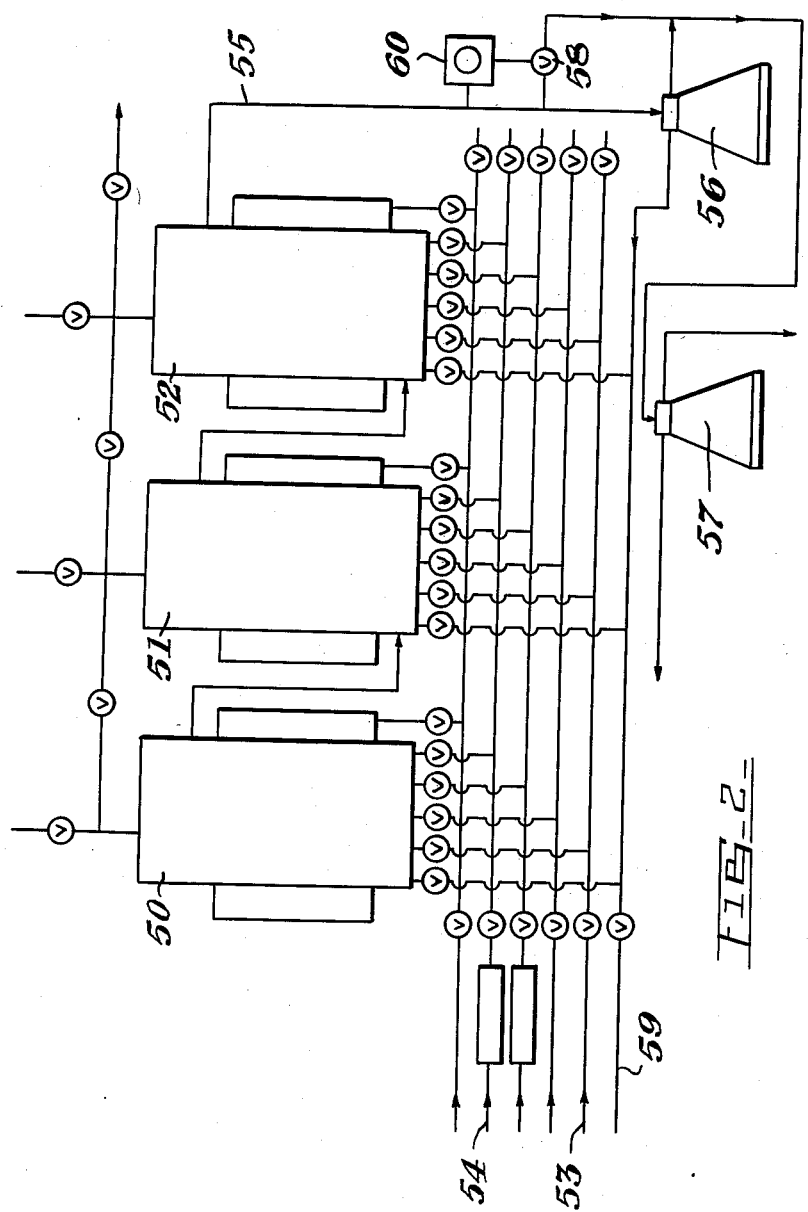
Figure 2 is a schematic flowsheet illustrating apparatus used for carrying out the process of the invention with one yeast propagation vessel and two alcohol producing vessels in the product formation stage.

In Figure 2, the process is illustrated as taking place in three vessels, the vessel 50 constituting the yeast propagation stage, and the vessels 51 and 52 together constituting the product formation stage.

A typical operation will be given by way of example, it being clearly understood that the temperatures, Plato readings, holdup times and yeast concentrated figures stated are purely illustrative and not intended to be construed in any limiting sense. Depending upon the particular requirements or natural variation, the values of the figures and their ratios one to another may quite properly be markedly different from those quoted.

Wort at 11.6° Plato is fed from the wort feed line 53 to the vessel 50 wherein yeast propagation has been initiated, and the temperature is being maintained at 60° F. under aerobic conditions produced by passing air from the air line 54 into the vessel through the sparger at the bottom thereof. The vessels 50, 51 and 52 are each of substantially the same size, and the wort moves through the system with a total holdup time of 36 hours after which time it appears outgoing from vessel 52 in line 55 at 2.5° Plato fully attenuated or not as the requirement may be and carrying 10% pressed yeast. As will be appreciated, the conditions in vessels 51 and 52 are maintained anaerobic throughout, and a temperature of 55° F. which is conducive to product quality is maintained. Typical Plato readings in the three vessels are as follows: vessel 50, 8.9°; vessel 51, 2.6°; vessel 52, 2.5°. The yeast concentration in vessel 50 is about 1.2% pressed yeast while that in vessels 51 and 52 is maintained constant at 10% pressed yeast by recycling as much yeast as may be necessary to maintain this concentration. In Figure 2, two yeast separators are indicated namely 56 and 57. A bypass valve 58 controls the amount of outgoing wort which passes to the yeast separator 56 and hence the amount of yeast which is returned via the yeast recycle line 59 to the vessel 51. Preferably, the bypass valve 58 is controlled by a yeast turbidity controller 60 which is arranged to open or close the bypass in accordance with whether the outgoing wort in line 55 contains too little or too much yeast. The outgoing beer from the bypass and from yeast separator 56 is passed to the further yeast separator 57 where the remainder of the yeast is separated and passed to storage on the one hand, while a clarified beer is passed to storage as indicated.

In Figure 2, the yeast separators are indicated as centrifuges. It will be appreciated, however, that other forms of yeast separators or concentrators may be used such for instance as settling tanks or the equivalent.

Figure 3:
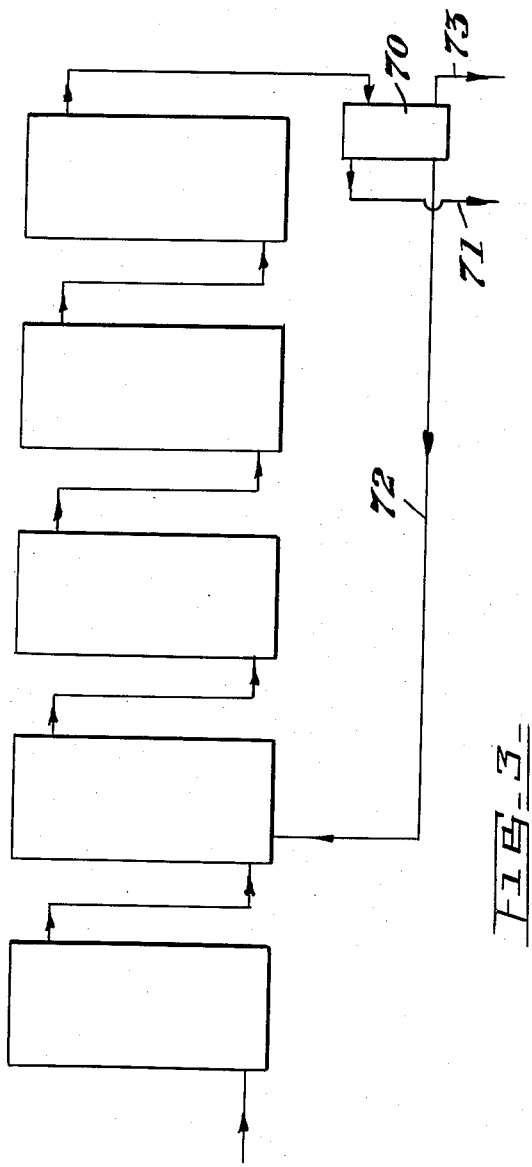
Figure 3 is a general schematic flowsheet illustrating the process of the invention as it would be carried out using four separate vessels in the product formation stage.

In Figure 3 where the product formation stage of the process embodies four separate vessels, the yeast separator is indicated as a settling tank 70, an arrangement which is particularly applicable where a flocculating yeast is used. Beer is drawn off the top and passed to storage in line 71, while recycle yeast is drawn from the bottom of the tank in line 72 and passed to the first of the vessels in the product formation stage of the process. Surplus yeast is also withdrawn from the bottom of settling tank 70 in line 73 in which it is passed to storage.

One of the principal advantages achieved by the present invention is that it enables independent control of the two main biological processes involved in the conversion of wort to beer, namely yeast propagation, and product formation.

Dealing first of all with yeast propagation, it will be appreciated that to the extent that the yeast is provided with conditions which favour growth and propagation these will predominate. This has two particularly desirable results, namely alcohol production under aerobic conditions, and the consequent production of oxidation products and other undesirable fermentation products harmful to flavour is kept to a minimum. On the other hand, development of yeast of the desired character present and condition is encouraged at the expense of unproductive or metabolically weak mutants. Hence, higher temperatures than normally possible may be utilized without harmful effects on the flavour of the resulting product, with the consequent advantage of shorter through times.

In the product formation stage the high yeast concentration coupled with anaerobic conditions discourages yeast growth and propagation, while it creates conditions which favour the formation of alcohol, with suppression of side reactions harmful to flavour. Not only is through time reduced by high yeast concentrations, but the above factors make possible the use of higher temperatures than usual and consequently further reduced through times without the flavour impairment which would normally be expected. Alternatively, lower temperatures than normal may be used to produce a higher quality product without the economically prohibitive lengthening of through time which would normally be expected.

Generally speaking, we have found that temperatures in the yeast propagation and product formation stages of the process of the invention may range from about 45° F. to 90° F. In many instances it may be desirable to maintain different temperatures in the two stages of the process. For instance a temperature about ten degrees higher in the yeast propagation stage than in the product formation stage produces advantages in reduction of total through time, as well as, in many cases, resulting in a more satisfactory yeast propagation per se.

It will be appreciated that the foregoing description is illustrative only and that considerable modification of the operating conditions set forth is possible without departing from the principles of the invention previously enunciated. It will be further appreciated that the process which has been described readily lends itself to the carrying out of various fermentation processes and particularly to the production of malt liquors such as lager beers, ales, stouts and other similar fermented beverages.

What we claim as our invention is:

1. A method for the production of a potable beverage by the continuous fermentation of a yeast fermentable substrate to produce a potable fermented beverage, said method comprising; maintaining, in separate vessels, separate yeast propagation and product formation process stages; maintaining aerobic conditions, favourable to yeast propagation in the yeast propagating stage; maintaining substantially anaerobic conditions favourable for alcohol production in the product formation stage; continuously introducing fermentable substrate to the yeast propagating stage, continuously passing effluent consisting of propagated yeast suspended in substrate from the yeast propagation stage to the product formation stage; separating yeast from effluent of the product formation stage and re-introducing a portion of the separated yeast to the product formation stage to maintain the yeast concentration therein at an artificially high level.

2. The method of claim 1 wherein a controlled amount of fresh substrate is added to the product formation stage in addition to that contained in the effluent from the yeast propagation stage.

3. The method of claim 1 wherein the product formation stage comprises a plurality of sub-stages maintained in separate series-connected fermentation vessels.

4. A method for the production of potable beer by the continuous fermentation of brewer's wort, said method comprising; maintaining in separate vessels, separate yeast propagation and product formation process stages; maintaining aerobic conditions favourable to yeast propagation in the yeast propagating stage; maintaining substantially anaerobic conditions favourable for alcohol production in the product formation stage; continuously introducing brewer's wort to the yeast propagating stage, continuously passing effluent from the yeast propagation stage to the product formation stage; separating yeast from effluent of the product formation stage and re-introducing a portion of the separated yeast to the product formation stage to maintain the yeast concentration therein at an artificially high level.

5. A method for the continuous fermentation of brewer's wort to produce a potable beer, said method comprising; maintaining in separate vessels, separate yeast propagation and product formation process stages; maintaining aerobic conditions, and a predetermined temperature of from 45° F. to 90° F. in the yeast propagating stage; maintaining substantially anerobic conditions and a predetermined temperature of from 45° F. to 90° F. in the product formation stage; continuously introducing brewer's wort to the yeast propagating stage and maintaining yeast propagation therein, continuously passing effluent from the yeast propagation stage to the product formation stage; separating yeast from effluent of the product formation stage and reintroducing a portion of the separated yeast to the product formation stage to maintain the yeast concentration therein at an artificially high level.

6. A method as defined in claim 5 wherein the temperature in the yeast propagation stage is maintained about 10° F. above that in the product formation stage.

7. A method as defined in claim 5 wherein the yeast concentration in the product formation stage is maintained at from about 5% to about 15% pressed cake.

8. A method as defined in claim 7 wherein the temperature in both stages of the process is maintained at a predetermined value within the range of from about 70° F. to about 90° F.

References Cited in the file of this patent

UNITED STATES PATENTS

| | | |
|---|---|---|
| 1,750,267 | Harrison | Mar. 11, 1930 |
| 2,155,134 | Karsch | Apr. 18, 1939 |
| 2,169,244 | Hildebrandt et al. | Aug. 15, 1939 |
| 2,451,156 | Mattos | Oct. 12, 1948 |
| 2,524,200 | Liebmann et al. | Oct. 3, 1950 |
| 2,635,070 | Gordon et al. | Apr. 14, 1953 |

OTHER REFERENCES

American Brewer—February 1943, article, "Continuous Fermentation," pp. 11, 12, 13, 14, 15, 16, 30, 32 and 34.

Notice of Adverse Decision in Interference

In Interference No. 92,207 involving Patent No. 2,967,107, K. H. Geiger and J. Compton, CONTINUOUS FERMENTATION PROCESS, final judgment adverse to the patentees was rendered Mar. 25, 1964, as to claims 1, 2, 3 and 4.

[*Official Gazette February 15, 1966.*]